(12) United States Patent
Phipps

(10) Patent No.: US 7,976,054 B1
(45) Date of Patent: Jul. 12, 2011

(54) SHOCK DAMPENING HITCH BALL ASSEMBLY

(75) Inventor: Jeffrey Sterling Phipps, Tallahassee, FL (US)

(73) Assignee: Growth Innovation, LLC, Tallahassee, FL (US)

( * ) Notice: Subject to any disclaimer, the term of this patent is extended or adjusted under 35 U.S.C. 154(b) by 287 days.

(21) Appl. No.: 12/151,428

(22) Filed: May 5, 2008

(51) Int. Cl.
*B60D 1/06* (2006.01)

(52) U.S. Cl. ........ 280/511; 280/507; 280/506; 280/504; 280/477; 280/484; 280/416.1; 280/415.1

(58) Field of Classification Search .................. 280/511, 280/507, 506, 504, 477, 484, 416.1, 415.1
See application file for complete search history.

(56) References Cited

U.S. PATENT DOCUMENTS

| | | | |
|---|---|---|---|
| 2,501,721 A | 3/1950 | Hagenah | |
| 2,516,555 A | 7/1950 | Dear | |
| 3,307,857 A * | 3/1967 | Robertson | 280/511 |
| 4,978,133 A | 12/1990 | Thorne et al. | |
| 5,085,452 A * | 2/1992 | Janeiro | 280/511 |
| 5,265,899 A * | 11/1993 | Harrison | 280/416.1 |
| 5,378,008 A * | 1/1995 | McCrossen | 280/507 |
| 5,823,560 A * | 10/1998 | Van Vleet | 280/484 |
| 6,581,953 B2 | 6/2003 | Jerry | |
| 6,908,098 B2 | 6/2005 | Milazzo | |
| 6,956,468 B2 * | 10/2005 | Lee et al. | 340/431 |

* cited by examiner

*Primary Examiner* — Paul N Dickson
*Assistant Examiner* — Marlon A Arce
(74) *Attorney, Agent, or Firm* — Peter Loffler

(57) ABSTRACT

A hitch ball assembly attenuates the lateral forces experienced by a trailer while being towed by a tractor. A ball assembly has a flange with a neck extending upwardly therefrom and a hitch ball seated atop the neck. A wedge, having a pair of linear points, extends downwardly from the flange as does a threaded shank that passes through the wedge, the points being located on either side of the shank. The ball assembly is attached to a draw bar attached mount arm such that the shank passes through a bore in the mount arm with the points of the wedge seated within slots on an upper surface of the mount arm. A resilient bushing is received on the shank and abuts a lower surface of the mount arm, while a plate abuts the bushing, each held thereat by a locking nut threadably attached to an end of the shank.

27 Claims, 2 Drawing Sheets

SHOCK DAMPENING HITCH BALL ASSEMBLY

This application claims the benefit of document disclosure number 600177 which is incorporated by reference herein in its entirety.

BACKGROUND OF THE INVENTION

1. Field of the Invention

The present invention relates to the art of trailer to tractor hitch assemblies wherein the ball structure of the hitch assembly is designed to rock back and forth and thereby absorb travel occasioned lateral shocks.

2. Background of the Prior Art

Trailers are often attached to towing vehicles or tractors via a releasable mechanical coupling. One of the most popular couplings, especially for smaller trailers, is the so-called hitch ball coupling. In this arrangement, a hitch receiver is affixed to the frame of the tractor in appropriate manner. A draw bar, which is an elongated shaft member, is slidably inserted longitudinally into the hollow interior of the hitch receiver and a locking pin is passed through aligned opening pairs on each of the hitch receiver and the draw bar, thereby coupling the two elements together. The end of the pin is clipped. A mount arm extends from the draw bar such that a hitch ball extends upwardly from the mount arm. The hitch ball is removably fastened to the mount arm by providing the hitch ball with a downwardly depending threaded shank that passes through a bore on the mount arm with a locking nut attached to a distal end of the shank in order to hold the hitch ball onto the mount arm. The trailer is equipped with a ball receiver, which is a tongue member that has a cylindrical cavity designed to receive the hitch ball therein. Once the hitch ball is received within the ball receiver, a latch secures the ball receiver to the hitch ball.

This arrangement is very convenient in that it allows rapid swapping of hitch balls upon the mount arm in order to accommodate different sized hitch balls as may be needed to accommodate trailers with differing sized ball receivers. Additionally, the draw bar can be quickly removed from the tractor whenever towing of a trailer is not desired and attached back thereto whenever towing is desired.

Due to the forces exerted on the coupling mechanisms that couple the trailer to the tractor, the components that make up the hitch assembly and the ball receiver are made from relatively thick and solid metal materials. While such components assure a solid mechanical coupling of trailer to tractor, certain shortcomings have been noted. Forces exerted on the trailer during road travel are transferred to the tractor due to the solid mechanical coupling of the trailer to the tractor. Such forces are occasioned from tractor acceleration and deceleration, and bumps in the roadway. Such transfer of forces not only results in a relatively unpleasant ride for passengers of the tractor, but also leads to relatively rapid degradation of the coupling components. Not only does such rapid wear on the components result in a relatively short lifespan for the coupling systems, if left unchecked, a catastrophic failure can occur during travel, resulting in a potentially dangerous situation for passengers of the tractor as well as others on the road.

To address this problem, devices have been proposed that attenuate the force transfer between trailer and tractor. Such devices, which can be found in a variety of architectures and which operate with varying degrees of efficiency, absorb many of the forces exerted by the trailer during travel so that such forces are neither occasioned upon the trailer-tractor coupling system, nor the tractor proper. By dampening the forces caused by acceleration, deceleration, and road bumps, the wear and tear presented onto the coupling systems is reduced, thereby extending the life span of the systems and decreasing the likelihood of a catastrophic failure. Additionally, as the travel forces are absorbed by the dampening system, such forces are not transferred to the tractor, so that the passengers of the tractor enjoy a relatively more comfortable ride.

Although many tractor owners favor such dampening systems, such systems are not without shortcomings. Many such prior art devices are of relatively complex design and construction so that such devices are relatively expensive to manufacture, resulting in a relatively expensive end product. By being expensive, many potential consumers of such devices tend to forgo purchasing the devices. Additionally, the complexity of such devices requires a high level of maintenance in order to keep the devices operationally sound. This is especially true when the trailer being towed operates in relatively harsh environments such as construction sites or bodies of water. The owner is faced with the task of spending time and possibly money to keep the device properly maintained, or forgo the maintenance, potentially resulting in the undesirable premature failure of the system.

Accordingly, there exists a need in the art for a device that couples a trailer to a tractor and that avoids the above stated shortcomings found in the prior-art. Specifically, such a device must provide a solid mechanical coupling of the trailer to the tractor, yet must attenuate the travel forces experienced by the trailer so as to reduce the wear and tear upon the coupling system and to give the passengers of the tractor a relatively comfortable ride. Such a device must be of relatively simple design and construction so as to be relatively inexpensive to manufacture in order to allow the device to be economically feasible to a wide swath of potential consumers for the device. The device must be relatively easy to maintain.

SUMMARY OF THE INVENTION

The shock dampening hitch ball assembly of the present invention addresses the aforementioned needs in the art by providing a system that mechanically couples a trailer to a tractor and attenuates the travel forces experienced by the trailer so as to reduce the wear and tear upon the coupling system while giving the passengers of the tractor a relatively comfortable ride. The shock dampening hitch ball assembly is of relatively simple design and construction, being created by standard manufacturing techniques, so as to be relatively inexpensive to produce thereby making the system economically feasible to a wide swath of potential consumers for the device. The shock dampening hitch ball assembly is relatively easy to maintain.

The shock dampening hitch ball assembly of the present invention is comprised of a flange that has a neck extending upwardly therefrom. A hitch ball is positioned atop the neck. A wedge that has a pair of linear points, extends downwardly from the flange. A shank extends downwardly from the flange and passes through the wedge such that each of the pair of linear points is located on an apposing side of the shank. The distal end of the shank is threaded. A resilient bushing is received on the shank while a nut is threadably secured to the threaded distal end of the shank and a plate is interposed between the nut and the bushing. The bushing has at least one downwardly facing beveled portion. A draw bar has a mount arm attached thereto such that the mount arm has an upper surface, a lower surface, and a bore passing between the upper surface and the lower surface. The shank passes through the bore with the pair of points of the wedge each resting upon the upper surface of the mount arm within respective slots thereon. The pair of slots is positioned in transverse orientation to a longitudinal axis of the draw bar.

BRIEF DESCRIPTION OF THE DRAWINGS

Similar reference numerals refer to similar parts throughout the several views of the drawings.

DESCRIPTION OF THE PREFERRED EMBODIMENT

Figures 1, 2:
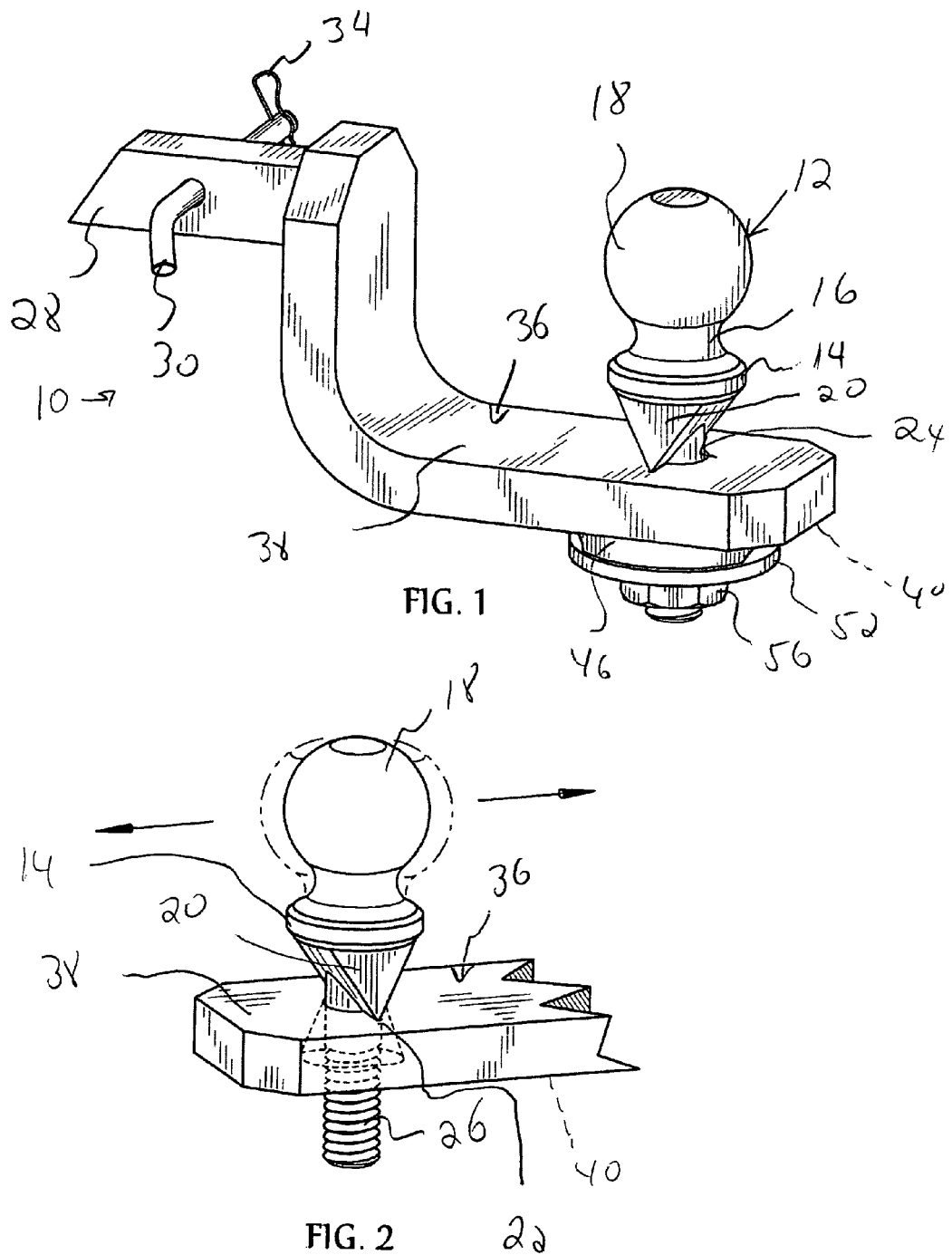
FIG. 1 is a perspective view of the shock dampening hitch ball assembly of the present invention.
FIG. 2 is a perspective view of the shock dampening hitch ball assembly illustrating the motion principles involved with the system.

Referring now to the drawings, it is seen that the shock dampening hitch ball assembly of the present invention, generally denoted by reference numeral 10, is comprised of a ball assembly 12 that has a flange 14, a neck 16 extending upwardly from the flange 14, and a hitch ball 18 atop the neck 16, the hitch ball 18 being of any appropriate size desired. A wedge 20 extends downwardly from the flange 14, the wedge 20 tapering to a pair of linear points 22 located on either side of a shank 24 that also extends downwardly from the flange 14 and passes through the wedge 20, the shank 24 having male threading 26 thereon and being longitudinally aligned with the hitch ball 18, the shank 24 extending beyond the points 22 of the wedge 20. The entire ball assembly 12 is made from an appropriate sturdy material such as an appropriate metal and may, but need not necessarily be, of monolithic construction.

Figure 3:
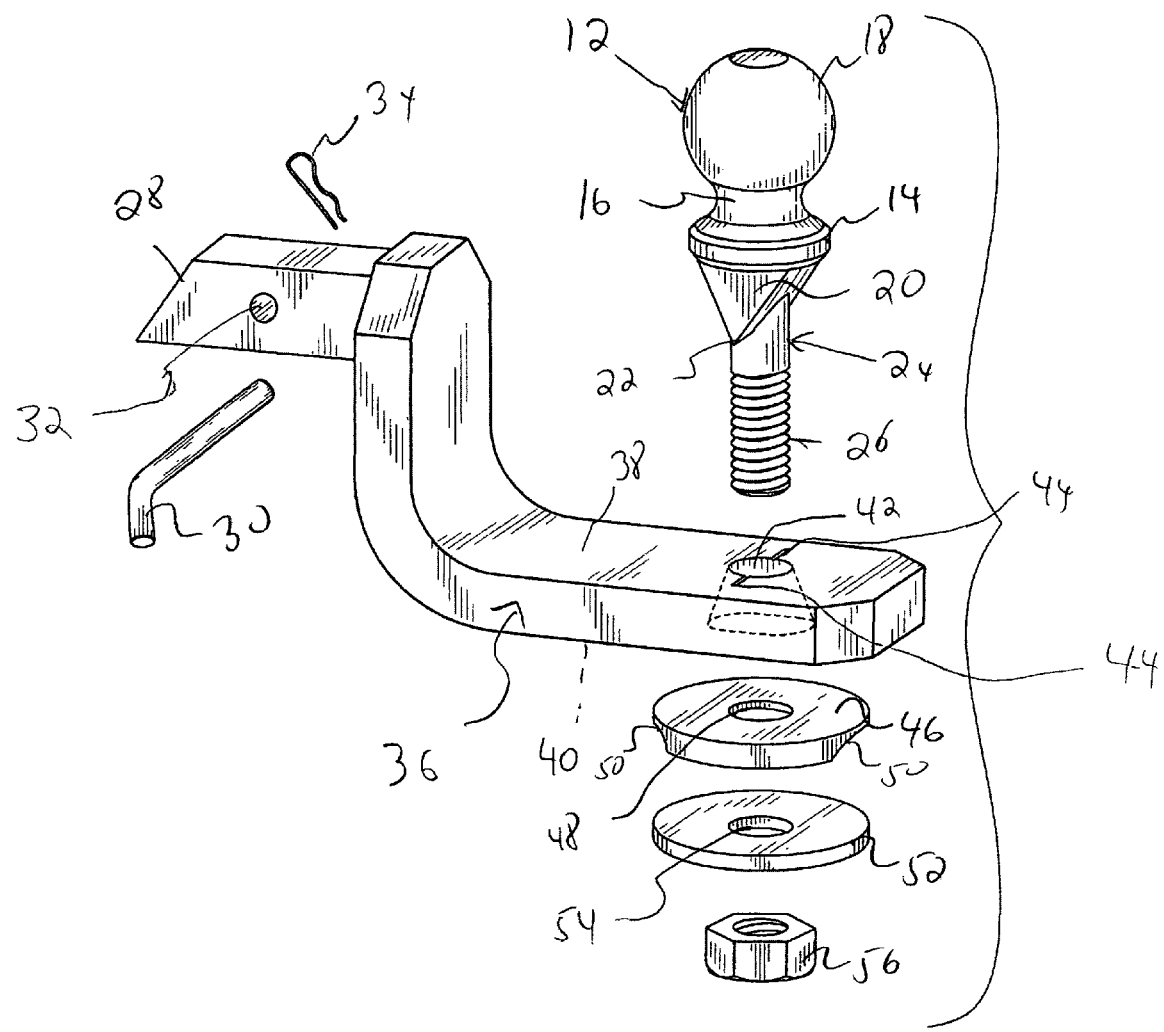
FIG. 3 is an exploded view of the shock dampening hitch ball assembly.

A typical draw bar 28 is adapted to be received within a standard hitch receiver (not illustrated) such that once the draw bar 28 is received within the hitch receiver, a pin 30 passes through aligned openings 32 on the draw bar 28 and on the hitch receiver in order to hold and maintain the draw bar 28 within the hitch receiver. A clip 34 is used to maintain the pin 30 within the aligned opening pairs. A mount arm 36 extends from the draw bar 28, the mount arm 36 having an upper surface 38 and a lower surface 40, the mount arm 36 also having a bore 42 extending between the upper surface 38 and the lower surface 40, such that bore 42 laterally (away from and toward the draw bar 28) tapers outwardly in progressing from the upper surface 38 to the lower surface 40. As seen in FIG. 3, a pair of aligned slots 44 are located on the upper surface 38 of the mount arm 36 on either side of the bore 42, the slots 44 being aligned transverse to the longitudinal axis of the draw bar 28.

The ball assembly 12 is secured to the mount arm 36 by passing the shank 24 of the ball assembly 12 through the upper surface 38 of the mount arm 36 and through the bore 42. The points 22 of the wedge 20 are received within respective slots 44 on the mount arm 36. A rubber or similar material bushing 46 is received on the shank 24 through an opening 48 in the bushing 46 such that the bushing 46 abuts against the lower surface 40 of the mount arm 36. As seen, the bushing 46 has a pair of beveled sections 50 thereon, the beveled sections being generally parallel with the slots 44 of the mount arm 36 and facing away from the flange 14. A plate 52 is received on the shank 24 through an opening 54 in the plate 52, such that the plate 52 is positioned in abutting relationship with the bushing 46 and such that the plate 52 overlies substantially the entire lower (beveled) surface of the bushing 46. Finally, a locking nut 56 is threadably positioned on the shank 24 in order to secure the ball assembly 12 onto the mount arm 36 and in order to abuttingly press the bushing 46 against the lower surface 40 of the mount arm 36 and to abuttingly press the plate 52 against the bushing 46, In operation, the shock dampening hitch ball assembly 10 of the present invention is attached to the towing vehicle or tractor (not illustrated) via the draw bar 28 in the usual way. If not already so attached, the ball assembly 12 is attached to the mount arm 36 in the manner previously discussed. Thereafter, the ball receiver of the trailer (neither illustrated) is attached to the hitch ball 18 in the usual way. The tractor is now free to tow the trailer.

During roadway travel, forces exerted on the trailer due to acceleration and deceleration, bumps and other causes are attenuated by the shock dampening hitch ball assembly 10. Specifically, lateral forces (forces along the longitudinal axis of the draw bar 28) are absorbed by the pivoting nature of the ball assembly 12 with respect to the mount arm 36. The points 22 of the wedge 20, being received within respective slots 44 on the upper surface 38 of the mount arm 36, permit the hitch ball 18 to pivot back and forth—toward and away from the draw bar 28—about the mount arm 36 in response to lateral forces exerted thereon. As the bore 42 laterally tapers outwardly in passing from the upper surface 38 to the lower surface 40 of the mount arm 36, the shank 24 is free to laterally travel within the bore 42 in response to hitch ball 18 travel. During hitch ball 18 travel, one side of the bushing 46 is compressed to help further absorb shock and vibration caused by road way forces acting on the trailer. The resilient nature of the bushing 46 allows the bushing to recover back to its original shape when lateral forces on the system diminish. This also helps the hitch ball 18 to recover to its normally relaxed vertical position. The plate 52, by being in covering relationship with the bushing 46, helps distribute the force load onto the entire bushing 46, with the beveling 48 of the bushing 46, assisting in bushing 46 compression and decompression. The pivoting nature of the ball assembly 12, coupled with the dampening effect provided by the bushing 46, help slow pivoting of the hitch ball 18 and thus help further attenuate the lateral forces experienced by the trailer and passed to the coupling system and thus the tractor.

As the points 22 of the wedge 20 are seated within respective slots 44 on the upper surface 38 of the mount arm 36, rotation of the hitch ball 18 is prevented.

While the invention has been particularly shown and described with reference to an embodiment thereof, it will be appreciated by those skilled in the art that various changes in form and detail may be made without departing from the spirit and scope of the invention.

I claim:

1. A hitch ball assembly comprising:
   a flange;
   a neck extending upwardly from the flange;
   a hitch ball positioned atop the neck;
   a wedge having a pair of linear points, the wedge extending downwardly from the flange in tapering fashion;
   a shank extending downwardly from the flange and passing through the wedge such that each of the pair of linear points is located on an apposing side of the shank;
   a resilient bushing received on the shank wherein the bushing has a downwardly facing beveled portion; and
   a nut threadably secured to an end of the shank the bushing being located between the nut and the flange.

2. The assembly as in claim 1 wherein the shank is threaded.

3. The assembly as in claim 1 further comprising a plate received on the shank between the bushing and the nut.

4. The assembly as in claim 1 further comprising:
   a draw bar;
   a mount arm attached to draw bar, the mount arm having an upper surface, a lower surface, and a bore passing between the upper surface and the lower surface; and
   such that the shank passes through the bore and such that each of the pair of points rests upon the upper surface of the mount arm.

5. The assembly as in claim 4 further comprising a pair of slots located on the upper surface of the mount arm such that each of the pair of points of the wedge is received within a respective one of the pair of slots.

6. The assembly as in claim 5 wherein the pair of slots is positioned in transverse, orientation with respect to a longitudinal axis of the draw bar.

7. The assembly as in claim 4 wherein the shank is threaded.

8. The assembly as in claim 4 wherein the bore laterally tapers outwardly in extending from the upper surface to the lower surface.

9. A hitch ball assembly comprising:
   a flange;
   a neck extending upwardly from the flange;
   a hitch ball positioned atop the neck;
   a wedge having a pair of linear points, the wedge extending downwardly from the flange in tapering fashion;
   a shank extending downwardly from the flange and passing through the wedge such that each of the pair of linear points is located on an apposing side of the shank;
   a draw bar;
   a mount arm attached to draw bar, the mount arm having an upper surface, a lower surface, and a bore passing between the upper surface and the lower surface;
   a pair of slots located on the upper surface of the mount arm; and
   such that the shank passes through the bore and such that each the pair of points rests upon the upper surface of the mount arm and received within a respective one of the pair of slots.

10. The assembly as in claim 9 further comprising;
    a resilient bushing received on the shank and positioned in abutting relationship with the lower surface of the mount arm; and
    a nut threadably secured to an end of the shank the bushing being located between the nut and the flange.

11. The assembly as in claim 10 wherein the bushing has a downwardly facing beveled portion.

12. The assembly as in claim 11 further comprising a plate received on the shank between the bushing and the nut.

13. The assembly as in claim 11 wherein the bore laterally tapers outwardly in extending from the upper surface to the lower surface.

14. The assembly as in claim 11 wherein the shank is threaded.

15. A hitch ball assembly comprising:
    a flange;
    a neck extending upwardly from the flange;
    a hitch ball positioned atop the neck;
    a wedge having a pair of linear points, the wedge extending downwardly from the flange in tapering fashion;
    a shank extending downwardly from the flange and passing through the wedge such that each of the pair of linear points is located on an apposing side of the shank;
    a resilient bushing received on the shank;
    a plate received on the shank between the bushing and the nut; and
    a nut threadably secured to an end of the shank, the bushing being located between the nut and the flange.

16. The assembly as in claim 15 wherein the shank is threaded.

17. The assembly as in claim 15 further comprising:
    a draw bar;
    a mount arm attached to draw bar, the mount arm having an upper surface, a lower surface, and a bore passing between the upper surface and the lower surface; and
    such that the shank passes through the bore and such that each of the pair of points rests upon the upper surface of the mount arm.

18. The assembly as in claim 17 further comprising a pair of slots located on the upper surface of the mount arm such that each of the pair of points of the wedge is received within a respective one of the pair of slots.

19. The assembly as in claim 18 wherein the pair of slots is positioned in transverse orientation with respect to a longitudinal axis of the draw bar.

20. The assembly as in claim 17 wherein the shank is threaded.

21. The assembly as in claim 17 wherein the bore laterally tapers outwardly in extending from the upper surface to the lower surface.

22. A hitch ball assembly comprising:
    a flange;
    a neck extending upwardly from the flange;
    a hitch ball positioned atop the neck;
    a wedge having a pair of linear points, the wedge extending downwardly from the flange in tapering fashion; and
    a shank extending downwardly from the flange and passing through the wedge such that each of the pair of linear points is located on an apposing side of the shank;
    a draw bar;
    a mount arm attached to draw bar, the mount arm having an upper surface, a lower surface, and a bore passing between the upper surface and the lower surface; and
    a pair of slots located on the upper surface of the mount arm such that each of the pair of points of the wedge is received within a respective one of the pair of slots;
    such that the shank passes through the bore and such that each of the pair of points rests upon the upper surface of the mount arm.

23. The assembly as in claim 22 wherein the shank is threaded.

24. The assembly as in claim 22 wherein the pair of slots is positioned in transverse orientation with respect to a longitudinal axis of the draw bar.

25. The assembly as in claim 22 wherein the bore laterally tapers outwardly in extending from the upper surface to the lower surface.

26. A hitch ball assembly comprising:
    a flange;
    a neck extending upwardly from the flange;
    a hitch ball positioned atop the neck;
    a wedge having a pair of linear points, the wedge extending downwardly from the flange in tapering fashion; and
    a shank extending downwardly from the flange and passing through the wedge such that each of the pair of linear points is located on an apposing side of the shank;
    a draw bar;
    a mount arm attached to draw bar, the mount arm having an upper surface, a lower surface, and a bore passing between the upper surface and the lower surface wherein the bore laterally tapers outwardly in extending from the upper surface to the lower surface; and such that the shank passes through the bore and such that each of the pair of points rests upon the upper surface of the mount arm.

27. The assembly as in claim 26 wherein the shank is threaded.

* * * * *